(12) United States Patent
Lyons

(10) Patent No.: US 12,335,659 B2
(45) Date of Patent: *Jun. 17, 2025

(54) HIDING PRIVATE USER DATA IN PUBLIC SIGNATURE CHAINS FOR USER AUTHENTICATION IN VIDEO CONFERENCES

(71) Applicant: Zoom Video Communications, Inc., San Jose, CA (US)

(72) Inventor: Karan Lyons, Los Angeles, CA (US)

(73) Assignee: Zoom Communications, Inc., San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/527,885

(22) Filed: Dec. 4, 2023

(65) Prior Publication Data

US 2024/0106981 A1 Mar. 28, 2024

Related U.S. Application Data

(63) Continuation of application No. 17/327,260, filed on May 21, 2021, now Pat. No. 11,843,900.

(51) Int. Cl.
*H04N 7/15* (2006.01)
*G06F 21/31* (2013.01)
(Continued)

(52) U.S. Cl.
CPC .......... *H04N 7/155* (2013.01); *G06F 21/31* (2013.01); *G06F 21/6245* (2013.01);
(Continued)

(58) Field of Classification Search
None
See application file for complete search history.

(56) References Cited

U.S. PATENT DOCUMENTS 10,650,164 B2 * 5/2020 Gouget .............. G06F 16/9535
11,374,911 B1 6/2022 Krohn
(Continued)

OTHER PUBLICATIONS

U.S. Appl. No. 17/327,260, "Notice of Allowance", Jul. 19, 2023, 10 pages.
(Continued)

*Primary Examiner* — Quoc D Tran
(74) *Attorney, Agent, or Firm* — Kilpatrick Townsend & Stockton LLP

(57) ABSTRACT

One example method includes receiving identification information associated with a new user device, the new user device associated with the user; accessing a signature chain associated with the user, the signature chain comprising one or more sequential records; associating user personal information with the new user device; generating a cryptographic signature based on cryptographic keys associated with the new user device; generating an obfuscated representation of the user personal information; generating a record comprising the identification information, the user personal information, the cryptographic signature, and the obfuscated representation of the user personal information; generating a cryptographic identifier based on the identification information, the cryptographic signature, the obfuscated representation of the user personal information, and a latest of the one or more sequential records; inserting the cryptographic identifier into the record; appending the record to the signature chain as a sequential record; receiving a request to join a video conference from the user device, the request identifying the new client device and the user as a participant in the video conference; and authenticating the user based on the record.

20 Claims, 7 Drawing Sheets

(51) Int. Cl.
  *G06F 21/62* (2013.01)
  *G06F 21/64* (2013.01)
  *H04L 9/08* (2006.01)
  *H04L 9/32* (2006.01)
  *H04L 9/00* (2022.01)

(52) U.S. Cl.
  CPC ............ *G06F 21/64* (2013.01); *H04L 9/0866* (2013.01); *H04L 9/3236* (2013.01); *H04L 9/3247* (2013.01); *G06F 2221/2101* (2013.01); *H04L 9/50* (2022.05); *H04L 2209/16* (2013.01)

(56) References Cited

U.S. PATENT DOCUMENTS

| | | | |
|---|---|---|---|
| 11,394,924 B1 | 7/2022 | Maxim | |
| 11,843,900 B2 * | 12/2023 | Lyons | G06F 21/64 |
| 2011/0135073 A1 | 6/2011 | Lingafelt et al. | |
| 2019/0036680 A1 * | 1/2019 | Sundaresan | H04L 9/30 |
| 2019/0229893 A1 | 7/2019 | Nenov et al. | |
| 2020/0186523 A1 | 6/2020 | Kursun et al. | |
| 2021/0099433 A1 * | 4/2021 | Soryal | H04N 21/8166 |

OTHER PUBLICATIONS

International Application No. PCT/US2022/028540, "International Preliminary Report on Patentability", Nov. 30, 2023, 11 pages.
International Application No. PCT/US2022/028540, "International Search Report and Written Opinion", Sep. 13, 2022, 15 pages.

* cited by examiner

… (1) …

HIDING PRIVATE USER DATA IN PUBLIC SIGNATURE CHAINS FOR USER AUTHENTICATION IN VIDEO CONFERENCES

CROSS REFERENCE TO RELATED APPLICATIONS

The present application is a continuation of co-pending U.S. patent application Ser. No. 17/327,260 filed on May 21, 2021, entitled "Hiding Private User Data in Public Signature Chains for User Authentication in Video Conferences, the entirety of which is hereby incorporated by reference.

FIELD

The present application generally relates to video conferencing and more specifically relates to systems and methods for hiding private user data in public signature chains for user authentication in video conferences.

BACKGROUND

Videoconferencing has become a common way for people to meet as a group, but without being at the same physical location. Participants can be invited to a video conference meeting, join from their personal computers or telephones, and are able to see and hear each other and converse largely as they would during an in-person group meeting or event. The advent of user-friendly video conferencing software has enabled teams to work collaboratively despite being dispersed around the country or the world. It has also enabled families and friends to engage with each other in more meaningful ways, despite being physically distant from each other.

SUMMARY

Various examples are described for systems and methods for hiding private user data in public signature chains for user authentication in video conferences. One example method includes receiving, by a video conference provider, identification information associated with a new user device, the new user device associated with the user; accessing, by the video conference provider, a signature chain associated with the user, the signature chain comprising one or more sequential records; associating, by the video conference provider, user personal information with the new user device; generating, by the video conference provider, a cryptographic signature based on cryptographic keys associated with the new user device; generating, by the video conference provider, an obfuscated representation of the user personal information; generating, by the video conference provider, a record comprising the identification information, the user personal information, the cryptographic signature, and the obfuscated representation of the user personal information; generating, by the video conference provider, a cryptographic identifier based on the identification information, the cryptographic signature, the obfuscated representation of the user personal information, and a latest of the one or more sequential records; inserting, by the video conference provider, the cryptographic identifier into the record; appending, by the video conference provider, the record to the signature chain as a sequential record; receiving, by the video conference provider, a request to join a video conference from the user device, the request identifying the new client device and the user as a participant in the video conference; and authenticating, by the video conference provider, the user based on the record.

One example system includes a communications interface; a non-transitory computer-readable medium; and one or more processors communicatively coupled to the communications interface and the non-transitory computer-readable medium, the one or more processors configured to execute processor-executable instructions stored in the non-transitory computer-readable medium to receive identification information associated with a new user device, the new user device associated with a user; access a signature chain associated with the user, the signature chain comprising one or more sequential records; associate user personal information with the new user device; generate a cryptographic signature based on cryptographic keys associated with the new user device; generate an obfuscated representation of the user personal information; generate a record comprising the identification information, the user personal information, the cryptographic signature, and the obfuscated representation of the user personal information; generate a cryptographic identifier based on the identification information, the cryptographic signature, the obfuscated representation of the user personal information, and a latest of the one or more sequential records; insert the cryptographic identifier into the record; append the record to the signature chain as a sequential record; receive a request to join a video conference from the user device, the request identifying the new client device and the user as a participant in the video conference; and authenticate the user based on the record.

One example non-transitory computer-readable medium; comprising processor-executable instructions configured to cause a processor to receive identification information associated with a new user device, the new user device associated with a user; access a signature chain associated with the user, the signature chain comprising one or more sequential records; associate user personal information with the new user device; generate a cryptographic signature based on cryptographic keys associated with the new user device; generate an obfuscated representation of the user personal information; generate a record comprising the identification information, the user personal information, the cryptographic signature, and the obfuscated representation of the user personal information; generate a cryptographic identifier based on the identification information, the cryptographic signature, the obfuscated representation of the user personal information, and a latest of the one or more sequential records; insert the cryptographic identifier into the record; append the record to the signature chain as a sequential record; receive a request to join a video conference from the user device, the request identifying the new client device and the user as a participant in the video conference; and authenticate the user based on the record.

These illustrative examples are mentioned not to limit or define the scope of this disclosure, but rather to provide examples to aid understanding thereof. Illustrative examples are discussed in the Detailed Description, which provides further description. Advantages offered by various examples may be further understood by examining this specification.

BRIEF DESCRIPTION OF THE DRAWINGS

The accompanying drawings, which are incorporated into and constitute a part of this specification, illustrate one or more certain examples and, together with the description of the example, serve to explain the principles and implementations of the certain examples.

DETAILED DESCRIPTION

Figure 1:
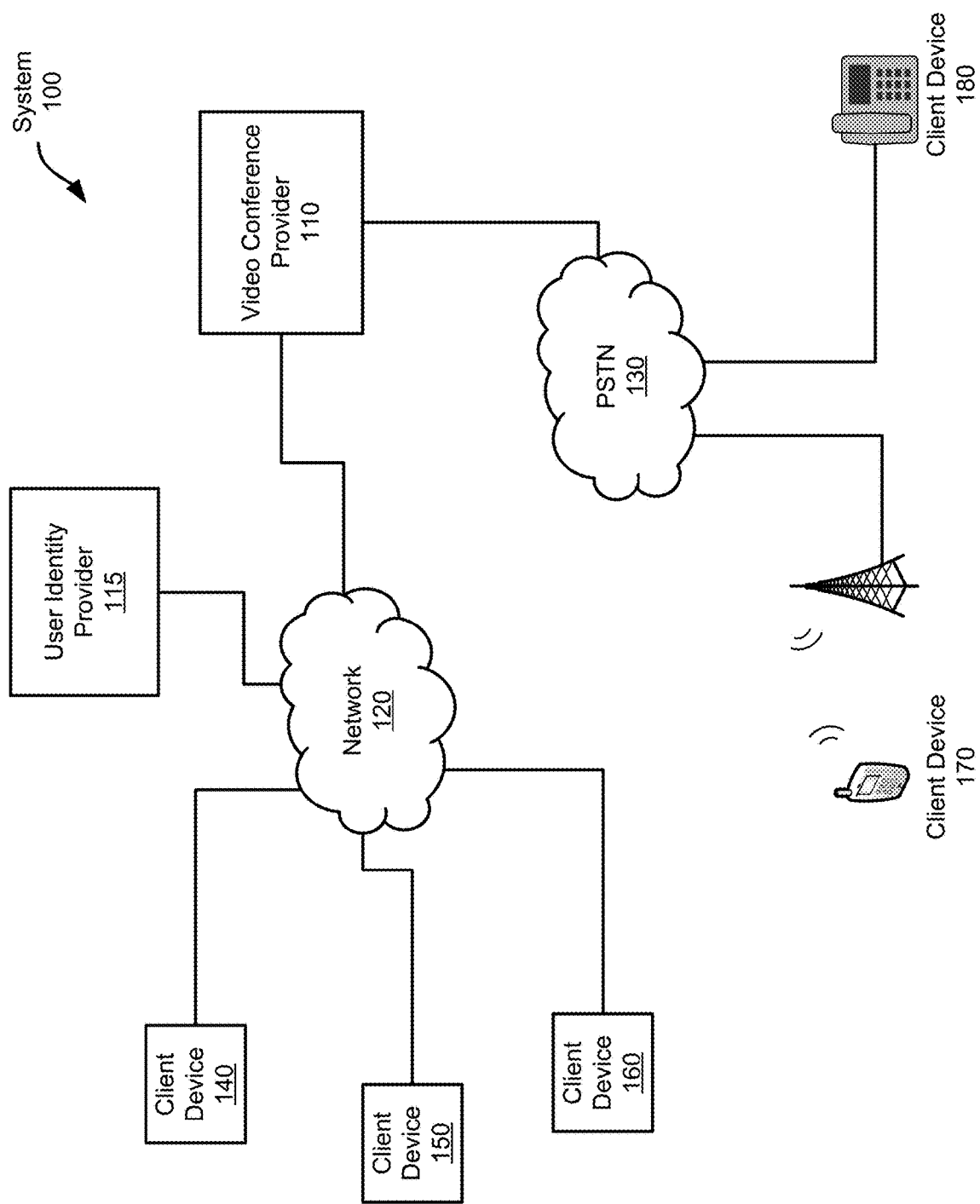
FIGS. 1-5 show example systems for hiding private user data in public signature chains for user authentication in video conferences.

Examples are described herein in the context of systems and methods for hiding private user data in public signature chains for user authentication in video conferences. Those of ordinary skill in the art will realize that the following description is illustrative only and is not intended to be in any way limiting. Reference will now be made in detail to implementations of examples as illustrated in the accompanying drawings. The same reference indicators will be used throughout the drawings and the following description to refer to the same or like items.

In the interest of clarity, not all of the routine features of the examples described herein are shown and described. It will, of course, be appreciated that in the development of any such actual implementation, numerous implementation-specific decisions must be made in order to achieve the developer's specific goals, such as compliance with application- and business-related constraints, and that these specific goals will vary from one implementation to another and from one developer to another.

People participate in video conferences for a wide variety of reasons, such as to keep in touch with family, conduct business, or manage groups or organizations. In some cases, participants in a video conference may wish to keep the contents of the video conference confidential and only available to certain authorized personnel. This can be done by encrypting audio and video that is streamed between participants to a video conference, which may prevent potential eavesdroppers from accessing the streamed audio and video. Without the necessary decryption information, accessing the encrypted audio and video can be prohibitively computationally difficult.

However, encryption only addresses some of the potential risks. For example, when creating a meeting to discuss confidential information, the host may only invite specific people that are authorized to access the confidential information to the meeting. In addition, the host may specify that the video and audio streams (or "multimedia streams") exchanged during the meeting is to be encrypted for all users. The host may even exclude the video conference provider that is facilitating the meeting from accessing the multimedia streams by employing end-to-end ("E2E") encryption, a scheme whereby only the participants to the meeting are provided with cryptographic keys needed to encrypt and decrypt the multimedia streams.

A weakness to encryption is if an unauthorized person is able to gain access to the meeting, such as by impersonating an authorized participant, and receive the cryptographic keys needed to decrypt the various multimedia streams. To prevent unauthorized persons from accessing meetings, each participant invited to the meeting may be required to establish an electronic "identity," either with the video conference provider or with another trusted entity. The identity, such as a user account with the video conference provider, may be accessed by the corresponding user by providing a user identifier, e.g., an email address or username, and a password. Once the identity has been accessed, the video conference provider can authenticate the user. However, in some examples, not all participants may have accounts with a video conference provider, or even if the participant does have access, the other participants may wish additional assurance that the identity has not been compromised.

To help authenticate identities, systems and methods according to this disclosure employ cryptographically signed records stored in a signature chain, which is associated with the user's identity. Each entry in the chain records certain information about the user, such as the user's email address or username, information about client devices that have been authorized by the user, location information, etc. In addition, the signature chain can carry records indicating changes to information within the signature chain, such as revocations of authorized devices, changes to email addresses or user identifiers, etc. Thus, the signature chain can carry information that may be used to determine whether a person purporting to be a particular user is, in fact, that user.

However, to secure the signature chain and to protect it from malicious alteration, which may enable a malicious actor to impersonate the user, each record in the signature chain carries a value that has been cryptographically generated using prior records in the chain. Thus, if a prior record is altered, such as by a malicious actor, an attempt to verify the cryptographic signature for a subsequent record would fail because the prior record had changed. For example, each record in the chain may include a cryptographic value that was generated based on data stored in the immediately previous record in the chain. Thus, each individual record's cryptographic value depends on the prior record's contents, including the prior record's own cryptographic value.

When a participant joins a meeting, the other participants may access the new participant's signature chain, which may be stored at a trusted entity such as the video conference provider, they can compare information about the new participant with the data recorded in the chain to determine if the new participant is likely the owner of the signature chain. For example, the participants in the meeting, or the host, may receive information from each participant that identifies the device they are using, their identity (e.g., a username, email address, etc.), their location, etc. For example, device identifiers may be unique identifiers assigned to the device, e.g., a serial number and manufacturer, an international mobile equipment identity ("IMEI") number, that may be difficult to spoof.

Upon receiving information from the other participants, each participant can also access the corresponding participant's signature chain and verify that the device, user identity, etc. are found in a record in the chain. In addition, the participants can verify that the signature chain is valid based on the cryptographic values stored in each record, such as by re-computing the value in a record based on the immediately preceding record in the chain. If the cryptographic value in the record matches the re-computed value, the other participants can be assured that the signature chain has not been tampered with and that the participant in question is not an imposter.

However, because such signature chains are resistant to tampering, they are also resistant to modifications of any kind Thus, any information stored in the signature chain cannot be deleted or modified without affecting the integrity of the entire chain. This can be problematic when information included in a signature chain may be personal to a user or be something the user otherwise wishes to delete. To enable a user to store personal or other sensitive information in their signature chain, while still enabling them to delete it, this example system does not store the specific information in the signature chain, but instead stores a proxy value that has been generated based on the personal information.

In one example, the user buys a new client device, such as a smartphone or a tablet computer, and gives that device a name, e.g., "Jane's new tablet." She then authorizes the device to be used with her identity by adding a new record to her signature chain that identifies this new tablet computer. To create the record, information is obtained, such as Jane's user identifier, a public key of Jane's cryptographic key pair, a device identifier for the tablet computer, and the device name ("Jane's new tablet"). The user identifier, public key, and device identifier are added to the record; however, rather than adding the new device name, the system performs a cryptographic hash on the new device name in conjunction with a random seed value. The resulting value is then inserted into the record as the device name, rather than "Jane's new tablet." A second hash value is then computed using the immediately preceding record in the signature chain. The second hash value is then inserted into a corresponding field in the record. The random seed value is then associated with the record, but is not made part of the record. And while this example uses cryptographic hashing, other examples may employ encryption instead of hashing, e.g., using an asymmetric key pair or a symmetric encryption key, which may enable retrieving the personal information with access to the correct key.

At a later time, when another user wishes to authenticate Jane during a video conference, they may access Jane's signature chain to authenticate her and admit her to the video conference. Because the user is able to access Jane's signature chain, they can view every record in the chain. However, because Jane has hashed her device's name, the other participants only have access to the hashed value. If Jane wishes to share the underlying information, or wishes to view it herself, she can share the underlying information. Further, if at a later time, Jane wishes to delete that device name, or at least the underlying value, she can delete the corresponding random seed value (or encryption key(s), if encryption was used to hide the personal information), rendering the hashed (or encrypted) information irretrievable. But because the hashed (or encrypted) value itself is unaffected, her signature chain can still be authenticated. And while this example discusses hiding personal information, such a technique can be used to hide any information in a signature chain without affecting the verifiability of the signature chain.

Techniques, such as those discussed above, may provide a more robust means for authenticating users in video conferences. It enables users to provide more detailed information in signature chain records, which can be used to authenticate the user, while allowing the user control over which information may be publically visible. In addition, it provides the user control over whether or when to delete information from a signature chain without affecting the integrity of the chain itself. Thus, users are provided with a greater degree of control over their own identities, while still enabling verifiable trust in those identities.

This illustrative example is given to introduce the reader to the general subject matter discussed herein and the disclosure is not limited to this example. The following sections describe various additional non-limiting examples and examples of systems and methods for hiding private user data in public signature chains.

Referring now to FIG. 1, FIG. 1 shows an example system 100 that provides videoconferencing functionality to various client devices. The system 100 includes a video conference provider 110 that is connected to multiple communication networks 120, 130, through which various client devices 140-180 can participate in video conferences hosted by the video conference provider 110. For example, the video conference provider 120 can be located within a private network to provide video conferencing services to devices within the private network, or it can be connected to a public network, e.g., the internet, so it may be accessed by anyone. Some examples may even provide a hybrid model in which a video conference provider 120 may supply components to enable a private organization to host private internal video conferences or to connect its system to the video conference provider 120 over a public network.

The system optionally also includes one or more user identity providers, e.g., user identity provider 115, which can provide user identity services to users of the client devices 140-160 and may authenticate user identities of one or more users to the video conference provider 110. In this example, the user identity provider 115 is operated by a different entity than the video conference provider 110, though in some examples, they may be the same entity.

Figure 2:
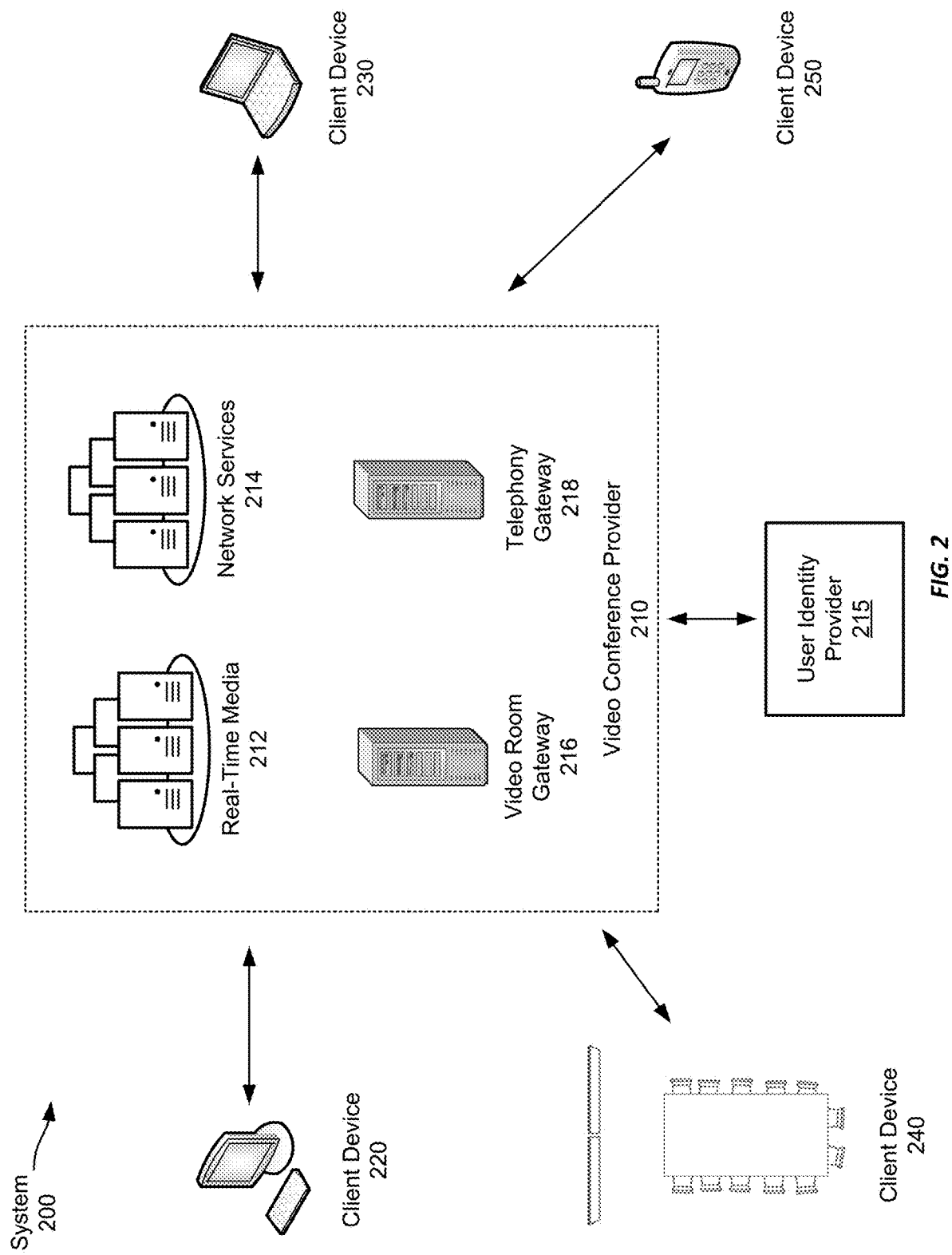

Video conference provider 110 allows clients to create videoconference meetings (or "meetings") and invite others to participate in those meetings as well as perform other related functionality, such as recording the meetings, generating transcripts from meeting audio, manage user functionality in the meetings, enable text messaging during the meetings, create and manage breakout rooms from the main meeting, etc. FIG. 2, described below, provides a more detailed description of the architecture and functionality of the video conference provider 110.

Meetings in this example video conference provider 110 are provided in virtual "rooms" to which participants are connected. The room in this context is a construct provided by a server that provides a common point at which the various video and audio data is received before being multiplexed and provided to the various participants. While a "room" is the label for this concept in this disclosure, any suitable functionality that enables multiple participants to participate in a common videoconference may be used. Further, in some examples, and as alluded to above, a meeting may also have "breakout" rooms. Such breakout rooms may also be rooms that are associated with a "main" videoconference room. Thus, participants in the main videoconference room may exit the room into a breakout room, e.g., to discuss a particular topic, before returning to the main room. The breakout rooms in this example are discrete meetings that are associated with the meeting in the main room. However, to join a breakout room, a participant must first enter the main room. A room may have any number of associated breakout rooms according to various examples.

To create a meeting with the video conference provider 110, a user may contact the video conference provider 110 using a client device 140-180 and select an option to create a new meeting. Such an option may be provided in a webpage accessed by a client device 140-160 or client application executed by a client device 140-160. For telephony devices, the user may be presented with an audio menu that they may navigate by pressing numeric buttons on their telephony device. To create the meeting, the video conference provider 110 may prompt the user for certain information, such as a date, time, and duration for the meeting, a number of participants, a type of encryption to use, whether the meeting is confidential or open to the public, etc. After receiving the various meeting settings, the video conference provider may create a record for the meeting and generate a meeting identifier and, in some examples, a corresponding meeting password or passcode (or other authentication information), all of which meeting information is provided to the meeting host.

After receiving the meeting information, the user may distribute the meeting information to one or more users to invite them to the meeting. To begin the meeting at the scheduled time (or immediately, if the meeting was set for an immediate start), the host provides the meeting identifier and, if applicable, corresponding authentication information (e.g., a password or passcode). The video conference system then initiates the meeting and may admit users to the meeting. Depending on the options set for the meeting, the users may be admitted immediately upon providing the appropriate meeting identifier (and authentication information, as appropriate), even if the host has not yet arrived, or the users may be presented with information indicating the that meeting has not yet started or the host may be required to specifically admit one or more of the users.

During the meeting, the participants may employ their client devices 140-180 to capture audio or video information and stream that information to the video conference provider 110. They also receive audio or video information from the video conference provider 210, which is displayed by the respective client device 140 to enable the various users to participate in the meeting.

At the end of the meeting, the host may select an option to terminate the meeting, or it may terminate automatically at a scheduled end time or after a predetermined duration. When the meeting terminates, the various participants are disconnected from the meeting and they will no longer receive audio or video streams for the meeting (and will stop transmitting audio or video streams). The video conference provider 110 may also invalidate the meeting information, such as the meeting identifier or password/passcode.

To provide such functionality, one or more client devices 140-180 may communicate with the video conference provider 110 using one or more communication networks, such as network 120 or the public switched telephone network ("PSTN") 130. The client devices 140-180 may be any suitable computing or communications device that have audio or video capability. For example, client devices 140-160 may be conventional computing devices, such as desktop or laptop computers having processors and computer-readable media, connected to the video conference provider 110 using the internet or other suitable computer network. Suitable networks include the internet, any local area network ("LAN"), metro area network ("MAN"), wide area network ("WAN"), cellular network (e.g., 3G, 4G, 4G LTE, 5G, etc.), or any combination of these. Other types of computing devices may be used instead or as well, such as tablets, smartphones, and dedicated video conferencing equipment. Each of these devices may provide both audio and video capabilities and may enable one or more users to participate in a video conference meeting hosted by the video conference provider 110.

In addition to the computing devices discussed above, client devices 140-180 may also include one or more telephony devices, such as cellular telephones (e.g., cellular telephone 170), internet protocol ("IP") phones (e.g., telephone 180), or conventional telephones. Such telephony devices may allow a user to make conventional telephone calls to other telephony devices using the PSTN, including the video conference provider 110. It should be appreciated that certain computing devices may also provide telephony functionality and may operate as telephony devices. For example, smartphones typically provide cellular telephone capabilities and thus may operate as telephony devices in the example system 100 shown in FIG. 1. In addition, conventional computing devices may execute software to enable telephony functionality, which may allow the user to make and receive phone calls, e.g., using a headset and microphone. Such software may communicate with a PSTN gateway to route the call from a computer network to the PSTN. Thus, telephony devices encompass any devices that can make conventional telephone calls and is not limited solely to dedicated telephony devices like conventional telephones.

Referring again to client devices 140-160, these devices 140-160 contact the video conference provider 110 using network 120 and may provide information to the video conference provider 110 to access functionality provided by the video conference provider 110, such as access to create new meetings or join existing meetings. To do so, the client devices 140-160 may provide user identification information, meeting identifiers, meeting passwords or passcodes, etc. In examples that employ a user identity provider 115, a client device, e.g., client devices 140-160, may operate in conjunction with a user identity provider 115 to provide user identification information or other user information to the video conference provider 110.

A user identity provider 115 may be any entity trusted by the video conference provider 110 that can help identify a user to the video conference provider 110. For example, a trusted entity may be a server operated by a business or other organization and with whom the user has established their identity, such as an employer or trusted third-party. The user may sign into the user identity provider 115, such as by providing a username and password, to access their identity at the user identity provider 115. The identity, in this sense, is information established and maintained at the user identity provider 115 that can be used to identify a particular user, irrespective of the client device they may be using. An example of an identity may be an email account established at the user identity provider 110 by the user and secured by a password or additional security features, such as biometric authentication, two-factor authentication, etc. However, identities may be distinct from functionality such as email. For example, a health care provider may establish identities for its patients. And while such identities may have associated email accounts, the identity is distinct from those email accounts. Thus, a user's "identity" relates to a secure, verified set of information that is tied to a particular user and should be accessible only by that user. By accessing the identity, the associated user may then verify themselves to other computing devices or services, such as the video conference provider 110.

When the user accesses the video conference provider 110 using a client device, the video conference provider 110 communicates with the user identity provider 115 using information provided by the user to verify the user's identity. For example, the user may provide a username or cryptographic signature associated with a user identity provider 115. The user identity provider 115 then either confirms the user's identity or denies the request. Based on this response, the video conference provider 110 either provides or denies access to its services, respectively.

For telephony devices, e.g., client devices 170-180, the user may place a telephone call to the video conference provider 110 to access video conference services. After the call is answered, the user may provide information regarding a video conference meeting, e.g., a meeting identifier ("ID"), a passcode or password, etc., to allow the telephony device to join the meeting and participate using audio devices of the telephony device, e.g., microphone(s) and speaker(s), even if video capabilities are not provided by the telephony device.

Because telephony devices typically have more limited functionality than conventional computing devices, they may be unable to provide certain information to the video conference provider 110. For example, telephony devices may be unable to provide user identification information to identify the telephony device or the user to the video conference provider 110. Thus, the video conference provider 110 may provide more limited functionality to such telephony devices. For example, the user may be permitted to join a meeting after providing meeting information, e.g., a meeting identifier and passcode, but they may be identified only as an anonymous participant in the meeting. This may restrict their ability to interact with the meetings in some examples, such as by limiting their ability to speak in the meeting, hear or view certain content shared during the meeting, or access other meeting functionality, such as joining breakout rooms or engaging in text chat with other participants in the meeting.

It should be appreciated that users may choose to participate in meetings anonymously and decline to provide user identification information to the video conference provider 110, even in cases where the user has an authenticated identity and employs a client device capable of identifying the user to the video conference provider 110. The video conference provider 110 may determine whether to allow such anonymous users to use services provided by the video conference provider 110. Anonymous users, regardless of the reason for anonymity, may be restricted as discussed above with respect to users employing telephony devices, and in some cases may be prevented from accessing certain meetings or other services, or may be entirely prevented from accessing the video conference provider 110.

Referring again to video conference provider 110, in some examples, it may allow client devices 140-160 to encrypt their respective video and audio streams to help improve privacy in their meetings. Encryption may be provided between the client devices 140-160 and the video conference provider 110 or it may be provided in an end-to-end configuration where multimedia streams transmitted by the client devices 140-160 are not decrypted until they are received by another client device 140-160 participating in the meeting. Encryption may also be provided during only a portion of a communication, for example encryption may be used for otherwise unencrypted communications that cross international borders.

Client-to-server encryption may be used to secure the communications between the client devices 140-160 and the video conference provider 110, while allowing the video conference provider 110 to access the decrypted multimedia streams to perform certain processing, such as recording the meeting for the participants or generating transcripts of the meeting for the participants. End-to-end encryption may be used to keep the meeting entirely private to the participants without any worry about a video conference provider 110 having access to the substance of the meeting. Any suitable encryption methodology may be employed, including key-pair encryption of the streams. For example, to provide end-to-end encryption, the meeting host's client device may obtain public keys for each of the other client devices participating in the meeting and securely exchange a set of keys to encrypt and decrypt multimedia content transmitted during the meeting. Thus the client devices 140-160 may securely communicate with each other during the meeting. Further, in some examples, certain types of encryption may be limited by the types of devices participating in the meeting. For example, telephony devices may lack the ability to encrypt and decrypt multimedia streams. Thus, while encrypting the multimedia streams may be desirable in many instances, it is not required as it may prevent some users from participating in a meeting.

By using the example system shown in FIG. 1, users can create and participate in meetings using their respective client devices 140-180 via the video conference provider 110. Further, such a system enables users to use a wide variety of different client devices 140-180 from traditional standards-based video conferencing hardware to dedicated video conferencing equipment to laptop or desktop computers to handheld devices to legacy telephony devices. etc.

Referring now to FIG. 2, FIG. 2 shows an example system 200 in which a video conference provider 210 provides videoconferencing functionality to various client devices 220-250. The client devices 220-250 include two conventional computing devices 220-230, dedicated equipment for a video conference room 240, and a telephony device 250. Each client device 220-250 communicates with the video conference provider 210 over a communications network, such as the internet for client devices 220-240 or the PSTN for client device 250, generally as described above with respect to FIG. 1. The video conference provider 210 is also in communication with one or more user identity providers 215, which can authenticate various users to the video conference provider 210 generally as described above with respect to FIG. 1.

In this example, the video conference provider 210 employs multiple different servers (or groups of servers) to provide different aspects of video conference functionality, thereby enabling the various client devices to create and participate in video conference meetings. The video conference provider 210 uses one or more real-time media servers 212, one or more network services servers 214, one or more video room gateways 216, and one or more telephony gateways 218. Each of these servers 212-218 is connected to one or more communications networks to enable them to collectively provide access to and participation in one or more video conference meetings to the client devices 220-250.

The real-time media servers 212 provide multiplexed multimedia streams to meeting participants, such as the client devices 220-250 shown in FIG. 2. While video and audio streams typically originate at the respective client devices, they are transmitted from the client devices 220-250 to the video conference provider 210 via one or more networks where they are received by the real-time media servers 212. The real-time media servers 212 determine which protocol is optimal based on, for example, proxy settings and the presence of firewalls, etc. For example, the client device might select among UDP, TCP, TLS, or HTTPS for audio and video and UDP for content screen sharing.

The real-time media servers 212 then multiplex the various video and audio streams based on the target client device and communicate multiplexed streams to each client device. For example, the real-time media servers 212 receive audio and video streams from client devices 220-240 and only an audio stream from client device 250. The real-time media servers 212 then multiplex the streams received from devices 230-250 and provide the multiplexed streams to client device 220. The real-time media servers 212 are adaptive, for example, reacting to real-time network and client changes, in how they provide these streams. For example, the real-time media servers 212 may monitor parameters such as a client's bandwidth CPU usage, memory and network I/O as well as network parameters such as packet loss, latency and jitter to determine how to modify the way in which streams are provided.

The client device 220 receives the stream, performs any decryption, decoding, and demultiplexing on the received streams, and then outputs the audio and video using the client device's video and audio devices. In this example, the real-time media servers do not multiplex client device 220's own video and audio feeds when transmitting streams to it. Instead each client device 220-250 only receives multimedia streams from other client devices 220-250. For telephony devices that lack video capabilities, e.g., client device 250, the real-time media servers 212 only deliver multiplex audio streams. The client device 220 may receive multiple streams for a particular communication, allowing the client device 220 to switch between streams to provide a higher quality of service.

In addition to multiplexing multimedia streams, the real-time media servers 212 may also decrypt incoming multimedia stream in some examples. As discussed above, multimedia streams may be encrypted between the client devices 220-250 and the video conference system 210. In some such examples, the real-time media servers 212 may decrypt incoming multimedia streams, multiplex the multimedia streams appropriately for the various clients, and encrypt the multiplexed streams for transmission.

In some examples, to provide multiplexed streams, the video conference provider 210 may receive multimedia streams from the various participants and publish those streams to the various participants to subscribe to and receive. Thus, the video conference provider 210 notifies a client device, e.g., client device 220, about various multimedia streams available from the other client devices 230-250, and the client device 220 can select which multimedia stream(s) to subscribe to and receive. In some examples, the video conference provider 210 may provide to each client device the available streams from the other client devices, but from the respective client device itself, though in other examples it may provide all available streams to all available client devices. Using such a multiplexing technique, the video conference provider 210 may enable multiple different streams of varying quality, thereby allowing client devices to change streams in real-time as needed, e.g., based on network bandwidth, latency, etc.

As mentioned above with respect to FIG. 1, the video conference provider 210 may provide certain functionality with respect to unencrypted multimedia streams at a user's request. For example, the meeting host may be able to request that the meeting be recorded or that a transcript of the audio streams be prepared, which may then be performed by the real-time media servers 212 using the decrypted multimedia streams, or the recording or transcription functionality may be off-loaded to a dedicated server (or servers), e.g., cloud recording servers, for recording the audio and video streams. In some examples, the video conference provider 210 may allow a meeting participant to notify it of inappropriate behavior or content in a meeting. Such a notification may trigger the real-time media servers to 212 record a portion of the meeting for review by the video conference provider 210. Still other functionality may be implemented to take actions based on the decrypted multimedia streams at the video conference provider, such as monitoring video or audio quality, adjusting or changing media encoding mechanisms, etc.

It should be appreciated that multiple real-time media servers 212 may be involved in communicating data for a single meeting and multimedia streams may be routed through multiple different real-time media servers 212. In addition, the various real-time media servers 212 may not be co-located, but instead may be located at multiple different geographic locations, which may enable high-quality communications between clients that are dispersed over wide geographic areas, such as being located in different countries or on different continents. Further, in some examples, one or more of these servers may be co-located on a client's premises, e.g., at a business or other organization. For example, different geographic regions may each have one or more real-time media servers 212 to enable client devices in the same geographic region to have a high-quality connection into the video conference provider 210 via local servers 212 to send and receive multimedia streams, rather than connecting to a real-time media server located in a different country or on a different continent. The local real-time media servers 212 may then communicate with physically distant servers using high-speed network infrastructure, e.g., internet backbone network(s), that otherwise might not be directly available to client devices 220-250 themselves. Thus, routing multimedia streams may be distributed throughout the video conference system 210 and across many different real-time media servers 212.

Turning to the network services servers 214, these servers 214 provide administrative functionality to enable client devices to create or participate in meetings, send meeting invitations, create or manage user accounts or subscriptions, and other related functionality. Further, these servers may be configured to perform different functionalities or to operate at different levels of a hierarchy, e.g., for specific regions or localities, to manage portions of the video conference provider under a supervisory set of servers. When a client device 220-250 accesses the video conference provider 210, it will typically communicate with one or more network services servers 214 to access their account or to participate in a meeting.

When a client device 220-250 first contacts the video conference provider 210 in this example, it is routed to a network services server 214. The client device may then provide access credentials for a user, e.g., a username and password or single sign-on credentials, to gain authenticated access to the video conference provider 210. This process may involve the network services servers 214 contacting a user identity provider 215 to verify the provided credentials. Once the user's credentials have been accepted, the client device 214 may perform administrative functionality, like updating user account information, if the user has an identity with the video conference provider 210, or scheduling a new meeting, by interacting with the network services servers 214.

In some examples, users may access the video conference provider 210 anonymously. When communicating anonymously, a client device 220-250 may communicate with one or more network services servers 214 but only provide information to create or join a meeting, depending on what features the video conference provider allows for anonymous users. For example, an anonymous user may access the video conference provider using client 220 and provide a meeting ID and passcode. The network services server 214 may use the meeting ID to identify an upcoming or on-going meeting and verify the passcode is correct for the meeting ID. After doing so, the network services server(s) 214 may then communicate information to the client device 220 to enable the client device 220 to join the meeting and communicate with appropriate real-time media servers 212.

In cases where a user wishes to schedule a meeting, the user (anonymous or authenticated) may select an option to schedule a new meeting and may then select various meeting options, such as the date and time for the meeting, the duration for the meeting, a type of encryption to be used, one or more users to invite, privacy controls (e.g., not allowing anonymous users, preventing screen sharing, manually authorize admission to the meeting, etc.), meeting recording options, etc. The network services servers 214 may then create and store a meeting record for the scheduled meeting. When the scheduled meeting time arrives (or within a threshold period of time in advance), the network services server(s) 214 may accept requests to join the meeting from various users.

To handle requests to join a meeting, the network services server(s) 214 may receive meeting information, such as a meeting ID and passcode, from one or more client devices 220-250. The network services server(s) 214 locate a meeting record corresponding to the provided meeting ID and then confirm whether the scheduled start time for the meeting has arrived, whether the meeting host has started the meeting, and whether the passcode matches the passcode in the meeting record. If the request is made by the host, the network services server(s) 214 activates the meeting and connects the host to a real-time media server 212 to enable the host to begin sending and receiving multimedia streams.

Once the host has started the meeting, subsequent users requesting access will be admitted to the meeting if the meeting record is located and the passcode matches the passcode supplied by the requesting client device 220-250. In some examples additional access controls may be used as well. But if the network services server(s) 214 determines to admit the requesting client device 220-250 to the meeting, the network services server 214 identifies a real-time media server 212 to handle multimedia streams to and from the requesting client device 220-250 and provides information to the client device 220-250 to connect to the identified real-time media server 212. Additional client devices 220-250 may be added to the meeting as they request access through the network services server(s) 214.

After joining a meeting, client devices will send and receive multimedia streams via the real-time media servers 212, but they may also communicate with the network services servers 214 as needed during meetings. For example, if the meeting host leaves the meeting, the network services server(s) 214 may appoint another user as the new meeting host and assign host administrative privileges to that user. Hosts may have administrative privileges to allow them to manage their meetings, such as by enabling or disabling screen sharing, muting or removing users from the meeting, creating sub-meetings or "break-out" rooms, recording meetings, etc. Such functionality may be managed by the network services server(s) 214.

For example, if a host wishes to remove a user from a meeting, they may identify the user and issue a command through a user interface on their client device. The command may be sent to a network services server 214, which may then disconnect the identified user from the corresponding real-time media server 212. If the host wishes to create a break-out room for one or more meeting participants to join, such a command may also be handled by a network services server 214, which may create a new meeting record corresponding to the break-out room and then connect one or more meeting participants to the break-out room similarly to how it originally admitted the participants to the meeting itself.

In addition to creating and administering on-going meetings, the network services server(s) 214 may also be responsible for closing and tearing-down meetings once they have completed. For example, the meeting host may issue a command to end an on-going meeting, which is sent to a network services server 214. The network services server 214 may then remove any remaining participants from the meeting, communicate with one or more real time media servers 212 to stop streaming audio and video for the meeting, and deactivate, e.g., by deleting a corresponding passcode for the meeting from the meeting record, or delete the meeting record(s) corresponding to the meeting. Thus, if a user later attempts to access the meeting, the network services server(s) 214 may deny the request.

Depending on the functionality provided by the video conference provider, the network services server(s) 214 may provide additional functionality, such as by providing private meeting capabilities for organizations, special types of meetings (e.g., webinars), etc. Such functionality may be provided according to various examples of video conferencing providers according to this description.

Referring now to the video room gateway servers 216, these servers 216 provide an interface between dedicated video conferencing hardware, such as may be used in dedicated video conferencing rooms. Such video conferencing hardware may include one or more cameras and microphones and a computing device designed to receive video and audio streams from each of the cameras and microphones and connect with the video conference provider 210. For example, the video conferencing hardware may be provided by the video conference provider to one or more of its subscribers, which may provide access credentials to the video conferencing hardware to use to connect to the video conference provider 210.

The video room gateway servers 216 provide specialized authentication and communication with the dedicated video conferencing hardware that may not be available to other client devices 220-230, 250. For example, the video conferencing hardware may register with the video conference provider 210 when it is first installed and the video room gateway servers 216 may authenticate the video conferencing hardware using such registration as well as information provided to the video room gateway server(s) 216 when dedicated video conferencing hardware connects to it, such as device ID information, subscriber information, hardware capabilities, hardware version information etc. Upon receiving such information and authenticating the dedicated video conferencing hardware, the video room gateway server(s) 216 may interact with the network services servers 214 and real-time media servers 212 to allow the video conferencing hardware to create or join meetings hosted by the video conference provider 210.

Referring now to the telephony gateway servers 218, these servers 218 enable and facilitate telephony devices' participation in meetings hosed by the video conference provider 210. Because telephony devices communicate using the PSTN and not using computer networking protocols, such as TCP/IP, the telephony gateway servers 218 act as an interface that converts between the PSTN and the networking system used by the video conference provider 210.

For example, if a user uses a telephony device to connect to a meeting, they may dial a phone number corresponding to one of the video conference provider's telephony gateway servers 218. The telephony gateway server 218 will answer the call and generate audio messages requesting information from the user, such as a meeting ID and passcode. The user may enter such information using buttons on the telephony device, e.g., by sending dual-tone multi-frequency ("DTMF") audio signals to the telephony gateway server 218. The telephony gateway server 218 determines the numbers or letters entered by the user and provides the meeting ID and passcode information to the network services servers 214, along with a request to join or start the meeting, generally as described above. Once the telephony client device 250 has been accepted into a meeting, the telephony gateway server 218 is instead joined to the meeting on the telephony device's behalf.

After joining the meeting, the telephony gateway server 218 receives an audio stream from the telephony device and provides it to the corresponding real-time media server 212, and receives audio streams from the real-time media server 212, decodes them, and provides the decoded audio to the telephony device. Thus, the telephony gateway servers 218 operate essentially as client devices, while the telephony device operates largely as an input/output device, e.g., a microphone and speaker, for the corresponding telephony gateway server 218, thereby enabling the user of the telephony device to participate in the meeting despite not using a computing device or video.

It should be appreciated that the components of the video conference provider 210 discussed above are merely examples of such devices and an example architecture. Some video conference providers may provide more or less functionality than described above and may not separate functionality into different types of servers as discussed above. Instead, any suitable servers and network architectures may be used according to different examples.

Figure 3:
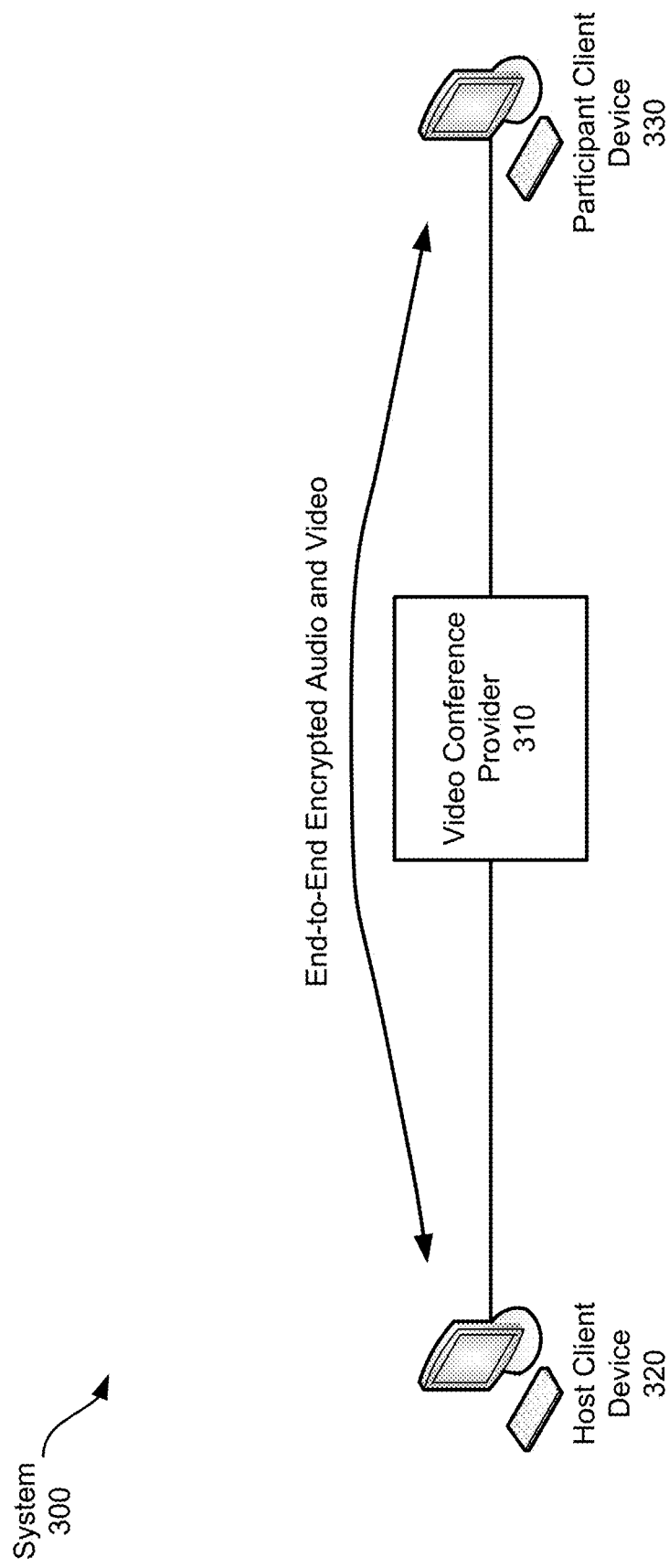

Referring now to FIG. 3, FIG. 3 illustrates a simplified system 300 that enables the users to engage in an E2E-encrypted video conference. The system includes two client devices 320, 330 and a video conference provider 310. The client devices 320, 330 are connected to the video conference provider 310 through one or more communication networks (not shown), generally as described above with respect to FIGS. 1 and 2.

In an E2E-encrypted video conference, each participant joins the video conference with their respective client device 320-330 and the host establishes a meeting key, e.g., a symmetric cryptographic key, that will be used to encrypt and decrypt the audio and video streams. Each of the participants also has their own respective public/private key pair that can be used to communicate with the respective participant and each participant's public key is published or distributed in any suitable manner, such as by registering it with a trusted entity or by generating a cryptographic signature using a private key and allowing the host or other participants to use a published copy of the public key to verify the signature.

Once each participant's public key has been verified, the host can securely distribute the meeting key to the participants by encrypting the meeting key using the participant's respective public keys. For example, the host may generate and send an encrypted message including the meeting key to each participant using the respective participant's public key. Upon receiving successfully decrypting the meeting key, the respective participants are then able to encrypt and decrypt meeting content.

In system 300 shown in FIG. 3, client device 320 initially connects to the video conference provider 310 and requests that the video conference provider create a new meeting. Once the meeting is created, client device 320 is designated as the host of the meeting and establishes a meeting key to use to provide for E2E encryption in the meeting, but does not provide it to the video conference provider 310. Subsequently, a participant client device 330 joins the meeting and generates and provides a cryptographically signed message using its private key to the host client device 320, which verifies the message using the participant's public key. After verifying the public key, the host client device 320 encrypts the meeting key using the participant's public key and transmits it to the participant client device 330, which decrypts the meeting key. Once the meeting key has been successfully received and decrypted by the participant client device 330, it may begin transmitting encrypted audio and video using the meeting key.

In this example, each participant generates a per-stream encryption key by computing a new key using a non-secret stream ID for each data stream it transmits (e.g., audio and video), and uses the corresponding stream encryption key to encrypt its audio and video stream(s). The video conference provider receives the various encrypted streams, multiplexes them generally as described above with respect to FIGS. 1 and 2, and distributes them to the various participating client devices 320, 330. The respective client devices 320, 330 can then use the meeting key to decrypt the incoming streams and view the content of the video conference.

However, as part of this process, the video conference provider 310 does not have access to the meeting key. Thus, the video conference provider 310 is unable to decrypt the various audio and video streams. But because the individual streams are separately received from the various participants, the video conference provider 310 is able to identify the source of each stream and therefore it can properly multiplex the streams for delivery to each participant. Thus, the participants are able to securely exchange multimedia streams using the video conference provider 310, without exposing the content of those streams to the video conference provider 310.

Figure 4:
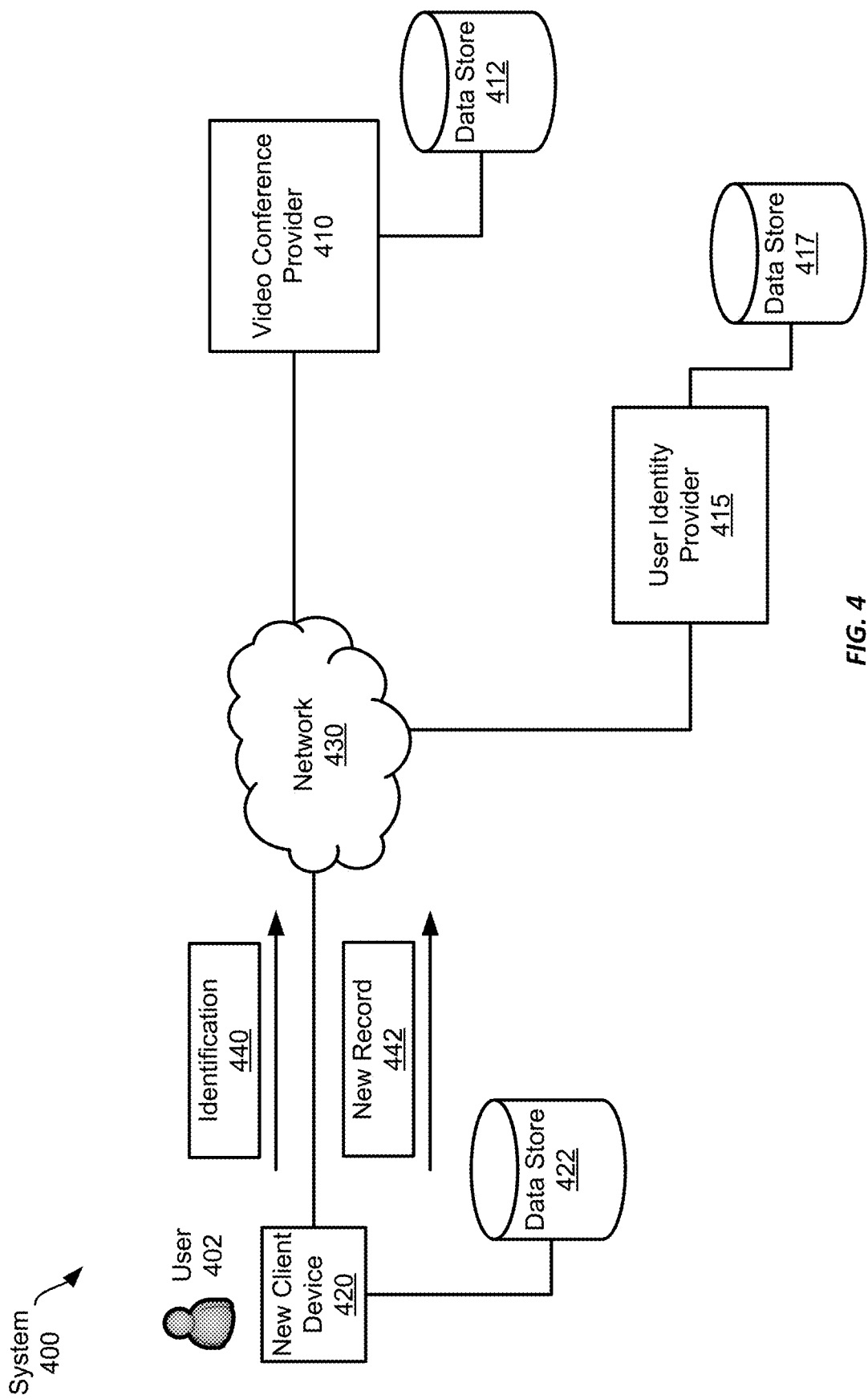

Referring now to FIG. 4, FIG. 4 shows an example system 400 for hiding private user data in public signature chains. In this example, the system 400 includes a new client device 420 associated with a known user 402 and having a data store 422. In addition, the system 400 includes a video conference provider 410, having a corresponding data store 412, and a user identity provider 415 and its corresponding data store 417.

In this example, the user 402 has a user account with the video conference provider 410 and another user account with the user identity provider 415, and can use either (or both) to help authenticate the user to third parties. In cases where the user 402 participates in video conferences facilitated by the video conference provider 410, the video conference provider 410 can help authenticate the user to other participants in a meeting, or it can communicate with the user identity provider 415 to do so, generally as discussed above with respect to FIGS. 1-2.

The user 402, in this system 400, has acquired a new client device 420 and wants to associate it with their identity maintained by the video conference provider 410. To do so, the user sends identification information 440 to the video conference provider 410, e.g., via a Web page or through video conferencing software, such as providing their username or email address and a password, to log into their account. The user then selects an option to associate the new client device 420 with their account. The new client device 420 then generates a new record for the user's signature chain, which is stored in the video conference provider's data store 412. For example, the new client device may generate a record having the following fields:

```
{
  "userID":
  "deviceID":
  "deviceName":
  "publicKey":
  "sequenceNumber":
  "prev":
}
```

The userID field stores a unique identifier assigned to the user, such as by the video conference provider 410; however, it could include any suitable identifying information, such as an email address, a username, an identification number, etc. The deviceID field stores information used to identify the device, such as a serial number (and a model number, in some examples), an IMEI number, a network adapter (e.g., Ethernet) MAC address, etc. And while an IMEI may be portable, in that it may be moved to a different device via a SIM card, the IMEI in conjunction with other device identification information, e.g., a device serial number, may form a unique identifier for the device.

The deviceName field stores the name of the client device, such as "Jane's new tablet." The publicKey field stores the public key of a cryptographic key-pair associated with the user. As discussed above with respect to FIG. 3, the public key pair may be used during meeting key distribution in an E2E-encrypted meeting. The sequenceNumber field stores a numeric value that is increased for each new record in a signature chain. Thus, the first record in the signature chain may have a sequence number of 0 or 1, while the next record would use the next number in the sequence, i.e., 1 or 2, and so forth for successive records that are added to the signature chain. Finally, the prev field stores a cryptographic hash value of the immediately preceding record in the signature chain.

Thus, in this example, the client device 420 generates a new record according to the format above and inserts information into the corresponding fields of the record. However, in this example, the deviceName field is identified as carrying personal information. Thus, rather than inserting "Jane's new tablet" as "plaintext" into the deviceName field, the client device 420 computes a cryptographic hash value over "Jane's new tablet" using a suitable cryptographic function, e.g., a hashing function and a random seed value or by using an encryption key. In this example, the SHA-256 hash function is used to generate the cryptographic hash value, i.e., the cipher text, but any other cryptographic hash function may be used, e.g., any SHA function such as SHA-512. In some examples, encryption may be employed, such as AES-GCM, ChaChaPoly, AES-CBC+MAC, etc. The hash (or encrypted) value is then stored in the deviceName field.

In addition to computing a hash for the deviceName field, the client device 420 also generates a cryptographic hash value over the preceding record in the user's signature chain, which the client device 420 obtains from the video conference provider 410 (in this example). It should be appreciated that the same cryptographic hash function that was used to generate the deviceName field (or any other suitable cryptographic hash function) may be used to generate the hash value for the "prev" field as well.

Once the record has been generated, the client device 420 transmits it 442 to the video conference provider 410. The video conference provider 410 then appends the new record to the user's signature chain. In addition, because the deviceName field includes a hashed value, the user can maintain the seed value used to compute the hash value at the client device 420, which can allow the user (or another entity) to reverse the hash and retrieve the plaintext from the cipher text. In some examples, the client device 420 may transmit the seed value to the video conference provider 410, which associates the seed value with the user's account, the record, and the deviceName field. In some examples, the user may maintain a signature chain at multiple locations, such as with user identity provider 415. Thus, the user may transmit the new record 442 and the seed value to the user identity provider 415 as well. Further, while the user may store parts (or all) of their signature chain at the video conference provider 410 or one or more user identity providers 415, it may also maintain a copy on their own device(s), such as by storing the signature chain in a data store 422. The user may also opt to synchronize its signature chain across multiple of its devices so that it is available irrespective of which device they are using.

In some examples, different identity providers may have only part of the user's full signature chain. For example, the user may primarily rely on user identity provider 415 for authentication, e.g., because user identity provider 415 is a corporate identity server at the user's place of business. Thus, new records may be added to the user's signature chain at the user identity provider 415 by default. However, the user may also participate in meetings facilitated by the video conference provider 410. Thus, portions of the security chain relevant to the user devices used to connect to meetings via the video conference provider 410 may also be supplied to the video conference provider 410. In some examples, this may happen when the user connects to the video conference provider 410 to join a meeting. At that time, the video conference provider 410 may request one or more records of the user's signature chain to verify the user's identity. The request may be sent to any trusted entity, which may include a trusted client device, e.g., client device 420, user identity provider 415, or to another user identity provider. Once the video conference provider 410 receives the requested records, it can authenticate the user.

Figure 5:
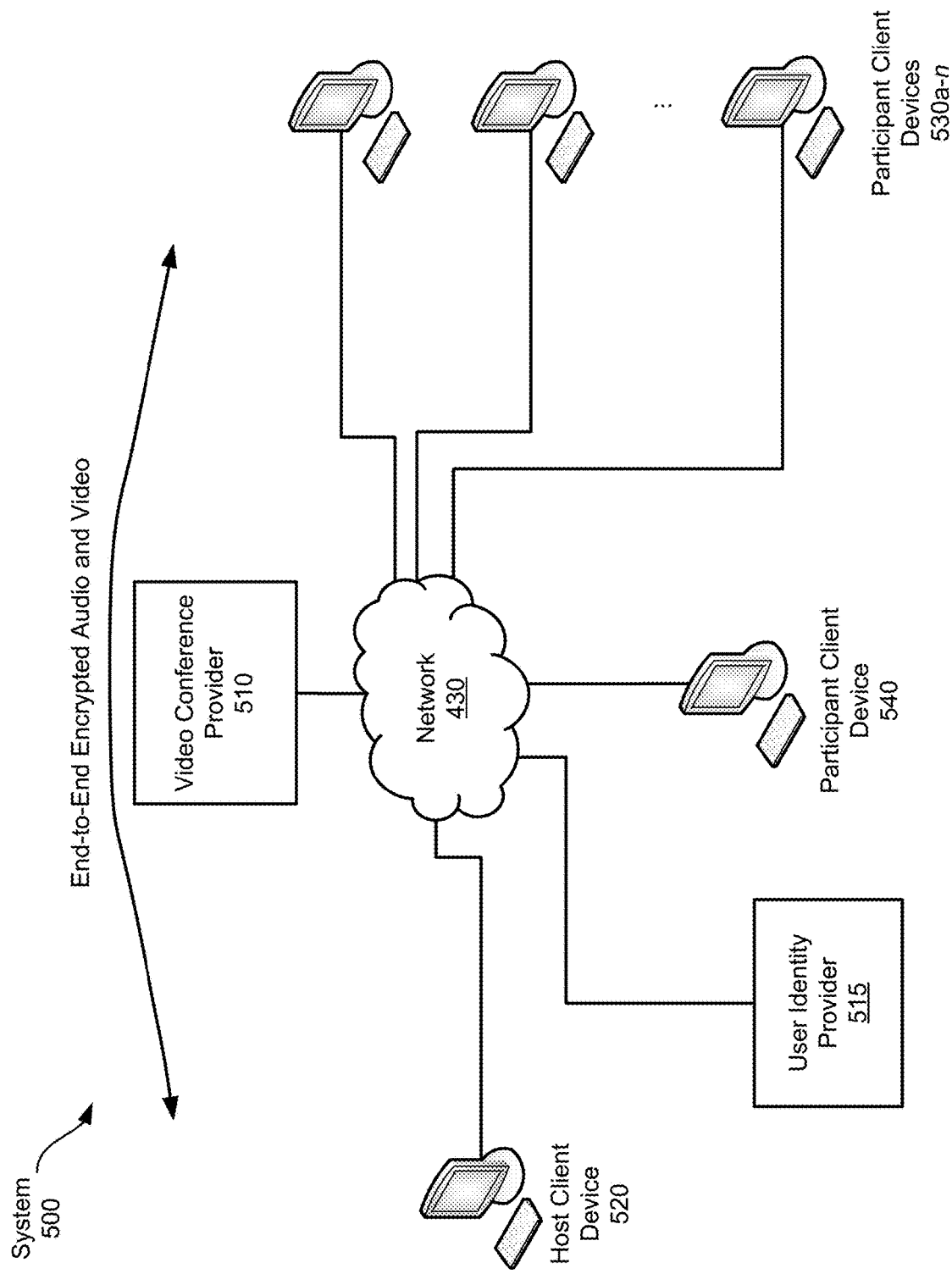

Referring now to FIG. 5, FIG. 5 shows an example system 500 in which multiple client devices 520, 530a-n are participating in an E2E-encrypted video conference facilitated by a video conference provider 510. In this example, the host client device 520 has started a meeting via the video conference provider 510, and the various participant client devices 530a-n have joined the meeting and are exchanging encrypted multimedia feeds.

Subsequently, a participant attempts to join the video conference using client device 540. In this example, because the meeting is operating as an E2E-encrypted meeting, the host client device 520 may attempt to authenticate the client device, rather than the video conference provider. Though in some examples, the video conference provider 510 may perform the authentication. And while this example employs E2E encryption, examples according to this disclosure can be used with non-E2E-encrypted video conferences.

To do so, the host client device 520 may receive certain information from the participant client device 540, such as a user identifier, a device identifier, a location, a public cryptographic key of a key pair, etc. The host client device 520 may then attempt to authenticate the user. First, the host client device 520 may attempt to determine whether the user is known to the user identity provider 515 or that the user has provided appropriate access credentials for the user identity provider, e.g., the user has supplied a recognized username and password to the user identity provider. If so, the host client device 520 may attempt to further ensure the identity of the user by authenticating the participant client device 540.

For example, the host client device 520 may transmit a message to the video conference provider 510 or to a user identity provider 515 to request part or all of the user's signature chain. In examples where the video conference provider 510 is untrusted, the host client device 520 may instead communicate with the user identity provider 515 to obtain the signature chain. Though, in some examples, if the video conference provider is trusted, the host may request the user's signature chain from the video conference provider 510.

In response, the user identity provider 515 provides one or more records of the user's signature chain to the host client device 520. The host device can verify the authenticity of the signature chain by computing the hash values of records in the chain and comparing them to the hash values stored in the "prev" field of the records. If the hash values match, the host client device 520 can confirm the authenticity of the signature chain.

In this example, because the records in the user's signature chain include personal information (or any information that the user wishes to remain confidential) that has been hidden by generating cipher text from a cryptographic hashing function based on a secret seed value, whether the user has purged the plaintext personal information from their signature record or not does not affect the host client device's ability to authenticate the records in the chain. As discussed above, the deviceName field includes the hashed or encrypted value of the plaintext device name, while the device's name is stored in another portion of the user's account, e.g., on a profile page, the user is not obligated to share the personal information with any other device to ensure authentication occurs correctly. Instead, the user can delete the information from their profile page and delete the seed value used to generate the cipher text of the personal information, thereby erasing it from the user's account, but without compromising the integrity of their signature chain. However, in some cases, the user may provide the seed value and the personal information to another participant, which would enable the participant to authenticate the user by computing the hash value and comparing it to the hash value stored in the user's signature chain.

The host client device 520 then searches for a record that includes information matching the information provided by the participant client device 540, e.g., a record indicating that the participant client device 540 has been added as a trusted device. In addition the host client device 520 searches for records indicating that the participant client device 540 hasn't been de-authorized by the user, such as by searching for a record revoking the participant client device's authorization.

If the host client device 520 does not identify a record authorizing the participant client device 540, or if the host client device 520 identifies a record revoking authorization to the participant client device 540, it may deny access to the meeting. However, if the host client device 520 is able to verify that the participant client device 540 is authorized, it may then admit the participant client device 540 and distribute the cryptographic meeting key(s) to the participant client device 540. In some examples, the host client device 520 may instead generate a new meeting key and distribute it to all the participant client devices 520, 530*a-n*, 540 in the meeting.

While the above example related to the host client device 520 attempting to authenticate the user and the participant client device 540, in some examples, the process may be performed by the video conference provider 510. Further, in some examples, the video conference provider 510 may maintain a copy of at least a portion of the user's signature chain and be able to authenticate the user with communicating with a separate user identity provider 515. In addition, while this example employs E2E encryption, other examples may not employ E2E encryption, but may still perform authentication using the techniques discussed herein.

Figure 6:
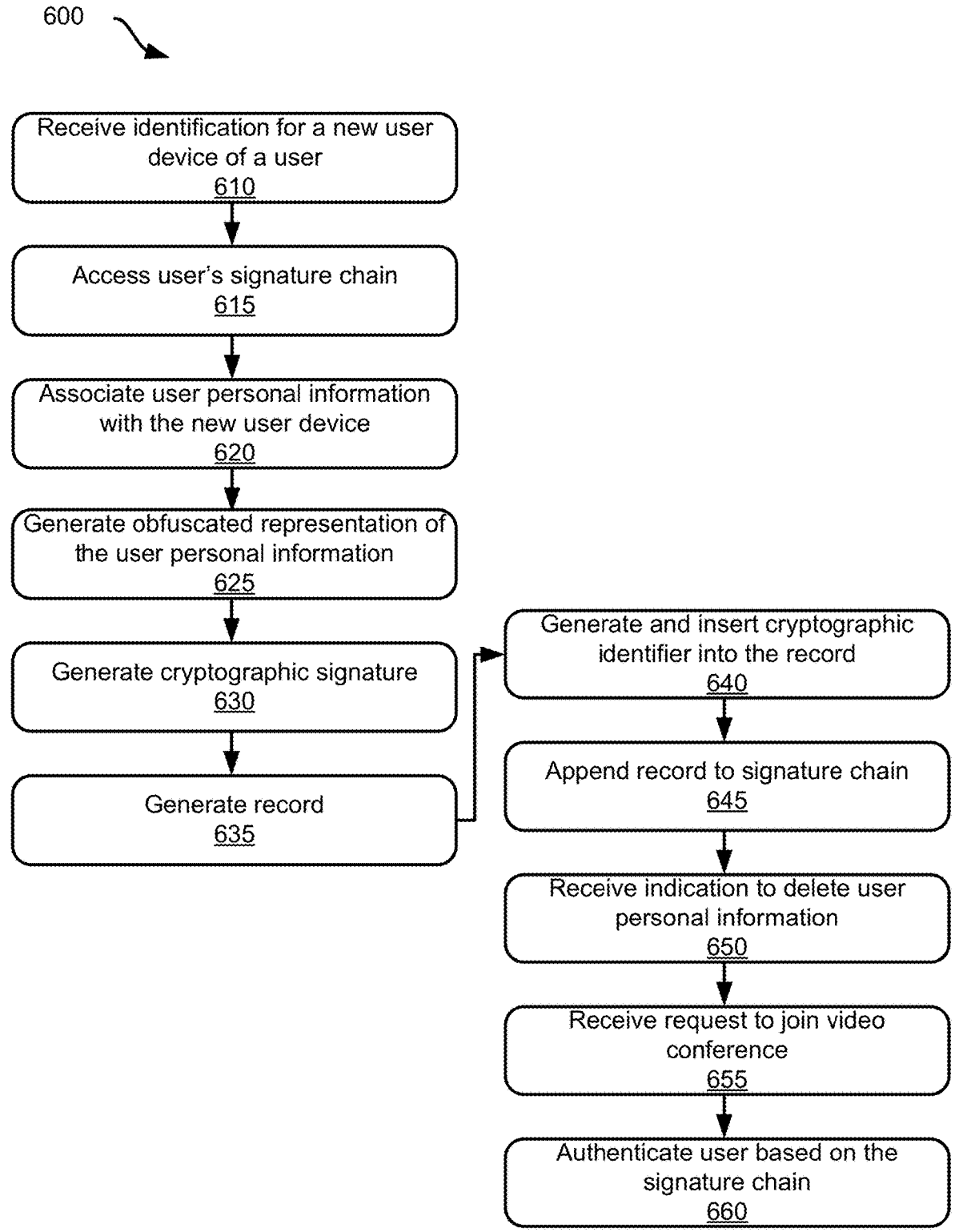
FIG. 6 shows an example method for hiding private user data in public signature chains for user authentication in video conferences.

Referring now to FIG. 6, FIG. 6 shows an example method 600 for hiding private user data in public signature chains. This example will be discussed with respect to the system 500 shown in FIG. 5; however, it should be appreciated that methods according to this disclosure may be used with any suitable system according to this disclosure, such as any of the systems 100-400 shown in FIGS. 1-4.

At block 610, a computing system, such as a server operated by the video conference provider 510, receives identification information associated with a new user device, which is associated with a user. In this example, the user is adding a new device to their profile so that they can more easily authenticate their identity during a video conference. The user accesses a user account, such as by providing a username and password. Once the user has accessed their account, they provide information about the new device, such as described above with respect to FIG. 4. In some examples, the user may use the new device to access their account and the computing system automatically receives the identification information for the device. The identification information may be information that is uniquely assigned to the device, such as a serial number (and a model number, in some examples), an IMEI number, a network adapter (e.g., Ethernet) MAC address, etc. And while an IMEI may be portable, in that it may be moved to a different device via a SIM card, the IMEI in conjunction with other device identification information, e.g., a device serial number, may form a unique identifier for the device. Further, any combination of device information may be collected and provided as identification information.

At block 615, the computing system 615 accesses the user's signature chain. As discussed above, a user may establish a signature chain with any suitable entity, such as the video conference provider 510 or an identity service provider 515. In addition, the user may have signature chains at multiple different entities, which may share records or have a partial set of records from a complete signature chain. For example, after the user adds a new device to their signature chain at the video conference provider 510, the user may not make the same addition to a copy of their signature chain at the identity service provider 515. For example, the user may not wish to use a device with services provided by the identity service provider 515, such as in the case where the new device is a personal device, while the identity service provider 515 is managed by the user's employer.

At block 620, the computing system associates user personal information with the new user device. In this example, the computing system, e.g., a server operated by the video conference provider 510, associates the device with the user's account, though in some examples, the computing system may obtain user personal information from the user, such as a personalized device name for the new device, a home address associated with the new device, a telephone number associated with the new device, etc. and stores that information as being associated with the new device. Such information may be stored in the user's profile and may storable in a record associated with the new device in the user's signature chain.

At block 625, the computing system generates an obfuscated representation of the user personal information. In this example, the video conference provider 510 computes one or more hash values based on the user personal information and a seed value, e.g., a random 32-byte value, using a cryptographic hash function, or by encrypting such information using an encryption key. For example, if the user personal information has only a single value or piece of information, e.g., a device name, a single hash or encrypted value may be computed. If multiple pieces of personal information are provided, a hash or encrypted value may be computed for each. Further, in this example, the video conference provider 510 uses the SHA-256 cryptographic hash function; however, any suitable cryptographic hash or encryption function may be used. The video conference provider 510 may then store the seed value and associate it with the user's account and the record generated subsequently at block 635.

At block 630, the computing system generates a cryptographic signature based on cryptographic keys associated with the new user device. In this example, the user maintains a set of cryptographic keys, such as keys of a key pair, that it can use to distribute or receive cryptographic meeting keys, or to send and receive encrypted communications. In this example, the video conference provider 510 generates a signature using a private key of the user's key pair, which may allow a user with access to the user's public key to decrypt the signature to verify the authenticity of the signature or the record. In some examples, the computing system may not generate such a signature, such as if records in the user's signature chain are not cryptographically signed.

At block 635, the computing system generates a record for the user's signature chain based on the identification information, the cryptographic signature, the obfuscated representation of the user personal information, and the last record in the user's signature chain. In this example, a new record is created according to a record format the user's signature chain and populated with the at least a portion of the identification information for the new client device 540, the cryptographic signature generated at block 630, the obfuscated representation of the user personal information generated at block 625, and the sequence number, e.g., 30, of the last record in the user's signature chain, but incremented by one, e.g., resulting in a sequence number of 31. It should be appreciated that while the records according to this example include the information described above, any suitable information may be included in a signature chain, including more than one field to receive obfuscated personal information.

At block 640, the computing system generates a cryptographic identifier based on the identification information, the cryptographic signature, the obfuscated representation of the user personal information, and the last record of the user's signature chain. In this example, the video conference provider 510 generates a cryptographic hash value using the data stored in the userID field, the deviceName field, the publicKey field, the sequenceNumber field, and the hash value stored in the "prev" field from the last record in the signature chain. The computing system then inserts the computed hash value into the "prev" field of the record generated at block 635.

At block 645, the computing system 645 appends the record to the user's signature chain. For example, the video conference provider 510 generates and stores an association between the record generated at block 635 and the last record in the user's signature chain.

At block 650, the computing system 650 receives an indication to delete the user's personal information. For example, the user may access their account at the video conference provider 510 and delete one or more pieces of their user personal information, e.g., the user may a personalized device name when changing the personalized device name or by eliminating the personalized device name. In some examples, the video conference provider may not actually store the user personal information, but only the seed value used to generate the obfuscated representation of the user personal information. However, by doing so, it renders the plaintext version of the user personal information irretrievable from the hash value stored in the record in the signature chain. In some examples, however, the video conference provider 510 may store a copy of such information, such as a part of the user's account. In one such example, the video conference provider 510 then deletes such user personal information from the user's account as well as the seed value used to generate the obfuscated representation of the user personal information stored in the record generated at block 635. However, because the user personal information is not directly stored in a record in the signature chain, the record itself is unaltered and the integrity of the signature chain is not compromised.

At block 655, a computing system receives a request from the new client device 540 to join a video conference. In this example, the video conference provider 510 receives the request; however, as discussed above, in some examples, the host client device 520, or another client device (such as a co-host client device), may receive the request.

At block 660, the computing system authenticates the user based on the user's signature chain. In this example, the video conference provider 510 receives the request from the new client device 540 and authenticates the user. To do so, the video conference provider 510 receives device information as well as user identification information from the client device. For example, the video conference provider 510 may receive the user's username and password from the new client device 540 to log the user into the user's account. In addition, the new client device 540 provides a device identification information, such as the device identification information discussed above with respect to block 610.

The video conference provider 510 then accesses the identified user's signature chain and searches for records corresponding to the user identification and the device identification information. For example, the video conference provider 510 may traverse the chain from the latest entry in the chain until an entry corresponding to the user identifier and the device identifier are located. The video conference provider 510 then determines whether the device is authorized. For example, a user may update their user identifiers or authorized devices over time, such as when they buy a new device, sell an old device, change email addresses or telephone numbers, etc. Thus, the video conference provider 510 may determine whether the record indicates the device is authorized or has had its authorization revoked.

For example, if the video conference provider 510 traverse the signature chain and identifies the following record:

{
 ...

```
"addDeviceID": 0xabc123
"deviceName": 0x0987fedc
...
"sequenceNumber": 15
"prev": 0xabcdef1234567890
}
```

The video conference provider 510 may identify the "AddDeviceID" field as an instruction to authorize a new device with Device ID 0xabc123. If the device identification information includes a device ID matching the device ID stored in the records, the video conference provider 510 may then verify the record itself, such as by accessing the next record in the chain and comparing its "prev" field with a hash generated over the record. As discussed above, even though the user has removed personal information from the signature chain, which was used to generate the hash value stored in the deviceName field, the record itself is not affected. Consequently, the video conference provider is able to verify the integrity of the record despite the underlying personal information being deleted.

If the record is authentic and the device IDs match, the video conference provider 510 may determine that the device is authorized. However, if the record instead includes a "RevokeDeviceID" field, and the device identifier received as a part of the request to join the video conference, the video conference provider 510 may determine that the device is unauthorized and it may deny access to the video conference. Alternatively, the video conference provider 510, if it locates an "AddDeviceID" record, it may then search for a "RevokeDeviceID" record corresponding to the same device identifier. If such a record is located, and the record occurs after the AddDeviceID record, it may determine that the user has since revoked authorization for the device ID and deny access to the video conference. The video conference provider 510 may perform a similar process for the user identifier by locating one or more records to determine whether the device ID is authorized for the user.

If the video conference provider 510 determines that all identification information received from the user is authorized, it may then authenticate the user and admit them to the video conference, or it may perform further authentication, such as by verifying the user's identity with a user identity provider 515.

It should be appreciated that while the method described above is performed by the video conference provider, in some examples, one or more of the participants in the video conference may performed such a method. For example, the user's own client device, e.g., client device 420, may perform blocks 610-640 in some examples. Further, the host of a meeting may perform some of the functionality discussed above. For example, the host may be able to access a user's signature chain at block 655 and authenticate the user based on information received from the user and based on one or more records in the signature chain.

Figure 7:
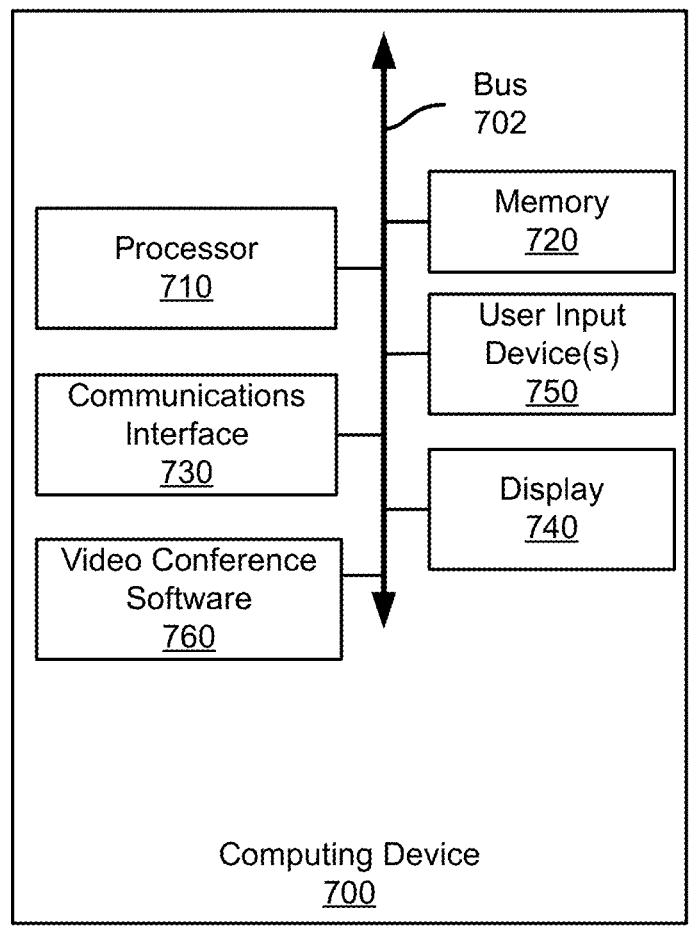
FIG. 7 shows an example computing device suitable for use with systems and methods for hiding private user data in public signature chains for user authentication in video conferences.

Referring now to FIG. 7, FIG. 7 shows an example computing device 700 suitable for use in example systems or methods for hiding private user data in public signature chains for user authentication in video conferences according to this disclosure. The example computing device 700 includes a processor 710 which is in communication with the memory 720 and other components of the computing device 700 using one or more communications buses 702. The processor 710 is configured to execute processor-executable instructions stored in the memory 720 to perform one or more methods for hiding private user data in public signature chains for user authentication in video conferences according to different examples, such as part or all of the example methods 400-600 described above with respect to FIGS. 4-6. The computing device 700, in this example, also includes one or more user input devices 750, such as a keyboard, mouse, touchscreen, microphone, etc., to accept user input. The computing device 700 also includes a display 740 to provide visual output to a user.

In addition, the computing device 700 includes video conference software 760 to enable a user to join and participate in a video conference, such as a conventional meeting or webinar, by receiving multimedia streams from a video conference provider, sending multimedia streams to the video conference provider, joining and leaving breakout rooms, such as described throughout this disclosure, etc.

The computing device 700 also includes a communications interface 740. In some examples, the communications interface 730 may enable communications using one or more networks, including a local area network ("LAN"); wide area network ("WAN"), such as the Internet; metropolitan area network ("MAN"); point-to-point or peer-to-peer connection; etc. Communication with other devices may be accomplished using any suitable networking protocol. For example, one suitable networking protocol may include the Internet Protocol ("IP"), Transmission Control Protocol ("TCP"), User Datagram Protocol ("UDP"), or combinations thereof, such as TCP/IP or UDP/IP.

While some examples of methods and systems herein are described in terms of software executing on various machines, the methods and systems may also be implemented as specifically-configured hardware, such as field-programmable gate array (FPGA) specifically to execute the various methods according to this disclosure. For example, examples can be implemented in digital electronic circuitry, or in computer hardware, firmware, software, or in a combination thereof. In one example, a device may include a processor or processors. The processor comprises a computer-readable medium, such as a random access memory (RAM) coupled to the processor. The processor executes computer-executable program instructions stored in memory, such as executing one or more computer programs. Such processors may comprise a microprocessor, a digital signal processor (DSP), an application-specific integrated circuit (ASIC), field programmable gate arrays (FPGAs), and state machines. Such processors may further comprise programmable electronic devices such as PLCs, programmable interrupt controllers (PICs), programmable logic devices (PLDs), programmable read-only memories (PROMs), electronically programmable read-only memories (EPROMs or EEPROMs), or other similar devices.

Such processors may comprise, or may be in communication with, media, for example one or more non-transitory computer-readable media, that may store processor-executable instructions that, when executed by the processor, can cause the processor to perform methods according to this disclosure as carried out, or assisted, by a processor. Examples of non-transitory computer-readable medium may include, but are not limited to, an electronic, optical, magnetic, or other storage device capable of providing a processor, such as the processor in a web server, with processor-executable instructions. Other examples of non-transitory computer-readable media include, but are not limited to, a floppy disk, CD-ROM, magnetic disk, memory chip, ROM, RAM, ASIC, configured processor, all optical media, all magnetic tape or other magnetic media, or any other medium from which a computer processor can read. The processor, and the processing, described may be in one or more structures, and may be dispersed through one or more structures. The processor may comprise code to carry out methods (or parts of methods) according to this disclosure.

The foregoing description of some examples has been presented only for the purpose of illustration and description and is not intended to be exhaustive or to limit the disclosure to the precise forms disclosed. Numerous modifications and adaptations thereof will be apparent to those skilled in the art without departing from the spirit and scope of the disclosure.

Reference herein to an example or implementation means that a particular feature, structure, operation, or other characteristic described in connection with the example may be included in at least one implementation of the disclosure. The disclosure is not restricted to the particular examples or implementations described as such. The appearance of the phrases "in one example," "in an example," "in one implementation," or "in an implementation," or variations of the same in various places in the specification does not necessarily refer to the same example or implementation. Any particular feature, structure, operation, or other characteristic described in this specification in relation to one example or implementation may be combined with other features, structures, operations, or other characteristics described in respect of any other example or implementation.

Use herein of the word "or" is intended to cover inclusive and exclusive OR conditions. In other words, A or B or C includes any or all of the following alternative combinations as appropriate for a particular usage: A alone; B alone; C alone; A and B only; A and C only; B and C only; and A and B and C.

That which is claimed is:

1. A method comprising:
   receiving identification information associated with a new user device, the new user device associated with the user;
   accessing a signature chain associated with the user, the signature chain comprising one or more sequential records;
   receiving user personal information associated with the new user device;
   generating an obfuscated representation of the user personal information based on the user personal information and a seed value;
   generating a cryptographic identifier based on a prior record and the obfuscated representation of the user personal information;
   generating a new sequential record for the signature chain based on the obfuscated user personal information, a cryptographic signature, the identification information, and the cryptographic identifier;
   adding the new sequential record to the signature chain;
   associating the seed value with a user account associated with the user;
   receiving a request to join a video conference, the request identifying the new user device and the user; and
   authenticating the user based on the new sequential record.

2. The method of claim 1, further comprising:
   receiving a request to delete personal information from the record;
   accessing the record; and
   deleting the personal information from the record.

3. The method of claim 2, wherein the authenticating the user based on the record occurs after deleting the personal information from the record.

4. The method of claim 1, further comprising:
   generating a second record comprising second identification information associated with a second user device, a second cryptographic signature based on second cryptographic keys associated with the second user device, and a second cryptographic identifier based on (i) the second identification information, (ii) the second cryptographic signature, and (iii) the record.

5. The method of claim 4, wherein generating the second cryptographic identifier comprises using a cryptographic hashing function on the second identification information, the second cryptographic signature, and the cryptographic identifier of the record.

6. The method of claim 4, further comprising, after generating the second record:
   receiving a request to delete personal information from the record;
   accessing the record;
   deleting the personal information from the record; and
   after deleting the personal information from the record, verifying the integrity of the second record based on the second cryptographic identifier.

7. The method of claim 1, wherein generating the obfuscated representation of the user personal information comprises using a cryptographic hashing function on the user personal information.

8. The method of claim 7, wherein generating the obfuscated representation of the user personal information further comprises using a cryptographic hashing function on the user personal information and a random numeric value.

9. A system comprising:
   a communications interface;
   a non-transitory computer-readable medium; and
   one or more processors communicatively coupled to the communications interface and the non-transitory computer-readable medium, the one or more processors configured to execute processor-executable instructions stored in the non-transitory computer-readable medium to:
      receive identification information associated with a new user device, the new user device associated with the user;
      access a signature chain associated with the user, the signature chain comprising one or more sequential records;
      receive user personal information associated with the new user device;
      generate an obfuscated representation of the user personal information based on the user personal information and a seed value;
      generate a cryptographic identifier based on a prior record and the obfuscated representation of the user personal information;
      generate a new sequential record for the signature chain based on the obfuscated user personal information, a cryptographic signature, the identification information, and the cryptographic identifier;
      add the new sequential record to the signature chain;
      associate the seed value with a user account associated with the user;
      receive a request to join a video conference, the request identifying the new user device and the user; and
      authenticate the user based on the new sequential record.

10. The system of claim 9, wherein the one or more processors are configured to execute further processor-executable instructions stored in the non-transitory computer-readable medium to:
receive a request to delete personal information from the record;
access the record; and
delete the personal information from the record.

11. The system of claim 10, wherein the authenticating the user based on the record occurs after deleting the personal information from the record.

12. The system of claim 9, wherein the one or more processors are configured to execute further processor-executable instructions stored in the non-transitory computer-readable medium to:
generate a second record comprising second identification information associated with a second user device, a second cryptographic signature based on second cryptographic keys associated with the second user device, and a second cryptographic identifier based on (i) the second identification information, (ii) the second cryptographic signature, and (iii) the record.

13. The system of claim 12, wherein the one or more processors are configured to execute further processor-executable instructions stored in the non-transitory computer-readable medium to use a cryptographic hashing function on the second identification information, the second cryptographic signature, and the cryptographic identifier of the record.

14. The system of claim 12, wherein the one or more processors are configured to execute further processor-executable instructions stored in the non-transitory computer-readable medium to, after generating the second record:
receive a request to delete personal information from the record;
access the record;
delete the personal information from the record; and
after deleting the personal information from the record, verify the integrity of the second record based on the second cryptographic identifier.

15. The system of claim 9, wherein the one or more processors are configured to execute further processor-executable instructions stored in the non-transitory computer-readable medium to use a cryptographic hashing function on the user personal information.

16. The system of claim 15, wherein the one or more processors are configured to execute further processor-executable instructions stored in the non-transitory computer-readable medium to use a cryptographic hashing function on the user personal information and a random numeric value.

17. A non-transitory computer-readable medium, comprising processor-executable instructions configured to cause one or more processors to:
receive identification information associated with a new user device, the new user device associated with the user;
access a signature chain associated with the user, the signature chain comprising one or more sequential records;
receive user personal information associated with the new user device;
generate an obfuscated representation of the user personal information based on the user personal information and a seed value;
generate a cryptographic identifier based on a prior record and the obfuscated representation of the user personal information;
generate a new sequential record for the signature chain based on the obfuscated user personal information, a cryptographic signature, the identification information, and the cryptographic identifier;
add the new sequential record to the signature chain;
associate the seed value with a user account associated with the user;
receive a request to join a video conference, the request identifying the new user device and the user; and
authenticate the user based on the new sequential record.

18. The non-transitory computer-readable medium of claim 17, further comprising processor-executable instructions configured to cause the one or more processors to:
receive a request to delete personal information from the record;
access the record;
delete the personal information from the record; and
wherein the authenticating the user based on the record occurs after deleting the personal information from the record.

19. The non-transitory computer-readable medium of claim 17, further comprising processor-executable instructions configured to cause the one or more processors to:
generate a second record comprising second identification information associated with a second user device, a second cryptographic signature based on second cryptographic keys associated with the second user device, and a second cryptographic identifier based on (i) the second identification information, (ii) the second cryptographic signature, and (iii) the record
after generate the second record:
receive a request to delete personal information from the record;
access the record;
delete the personal information from the record; and
after deleting the personal information from the record, verify the integrity of the second record based on the second cryptographic identifier.

20. The non-transitory computer-readable medium of claim 19, wherein generating the second cryptographic identifier comprises using a cryptographic hashing function on the second identification information, the second cryptographic signature, and the cryptographic identifier of the record.

* * * * *